Nov. 13, 1962 J. H. AUER, JR 3,063,179
VEHICLE PARKING AREA GATE CONTROL SYSTEM
Filed Oct. 16, 1959 4 Sheets-Sheet 1
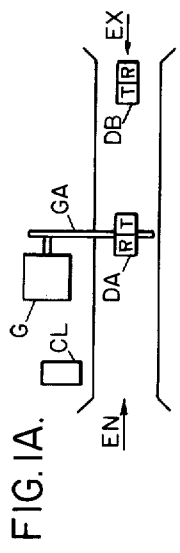
FIG.IA.
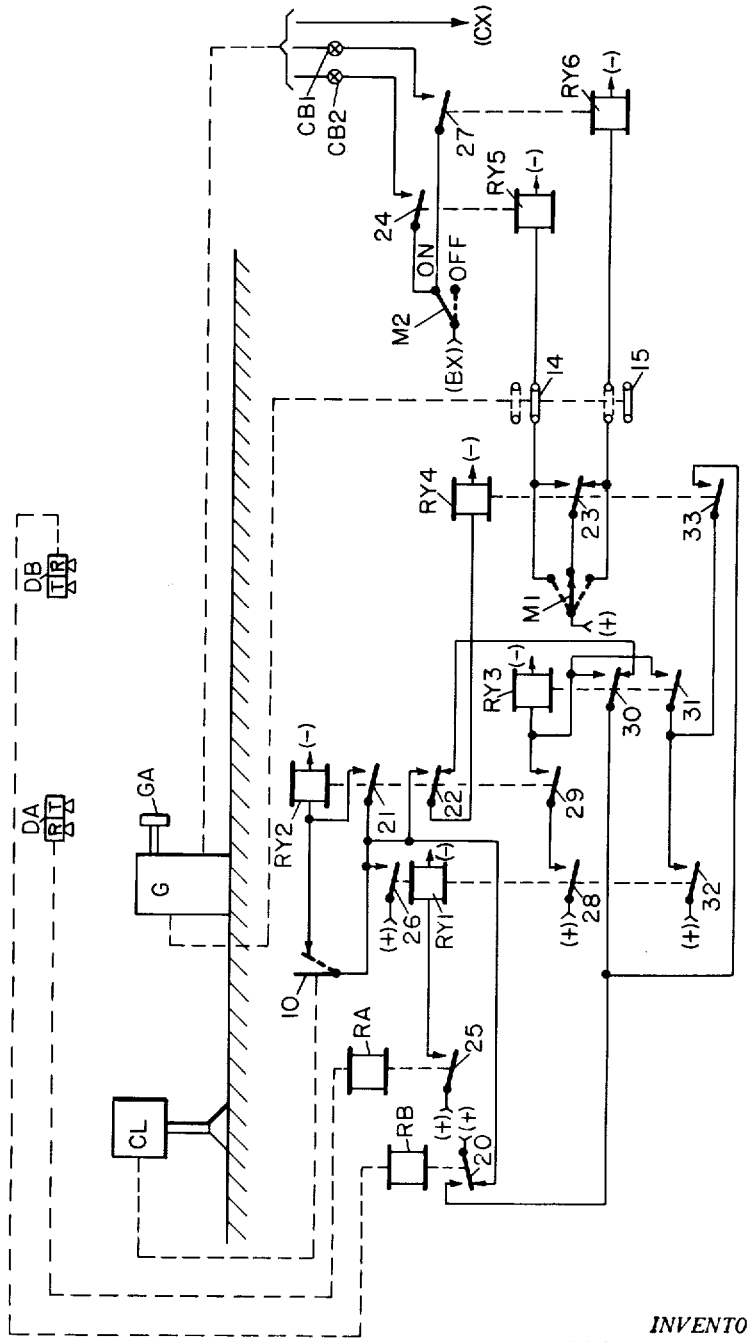
FIG.I.
INVENTOR.
J.H.AUER JR.
BY
Forest B. Hitchcock
HIS ATTORNEY

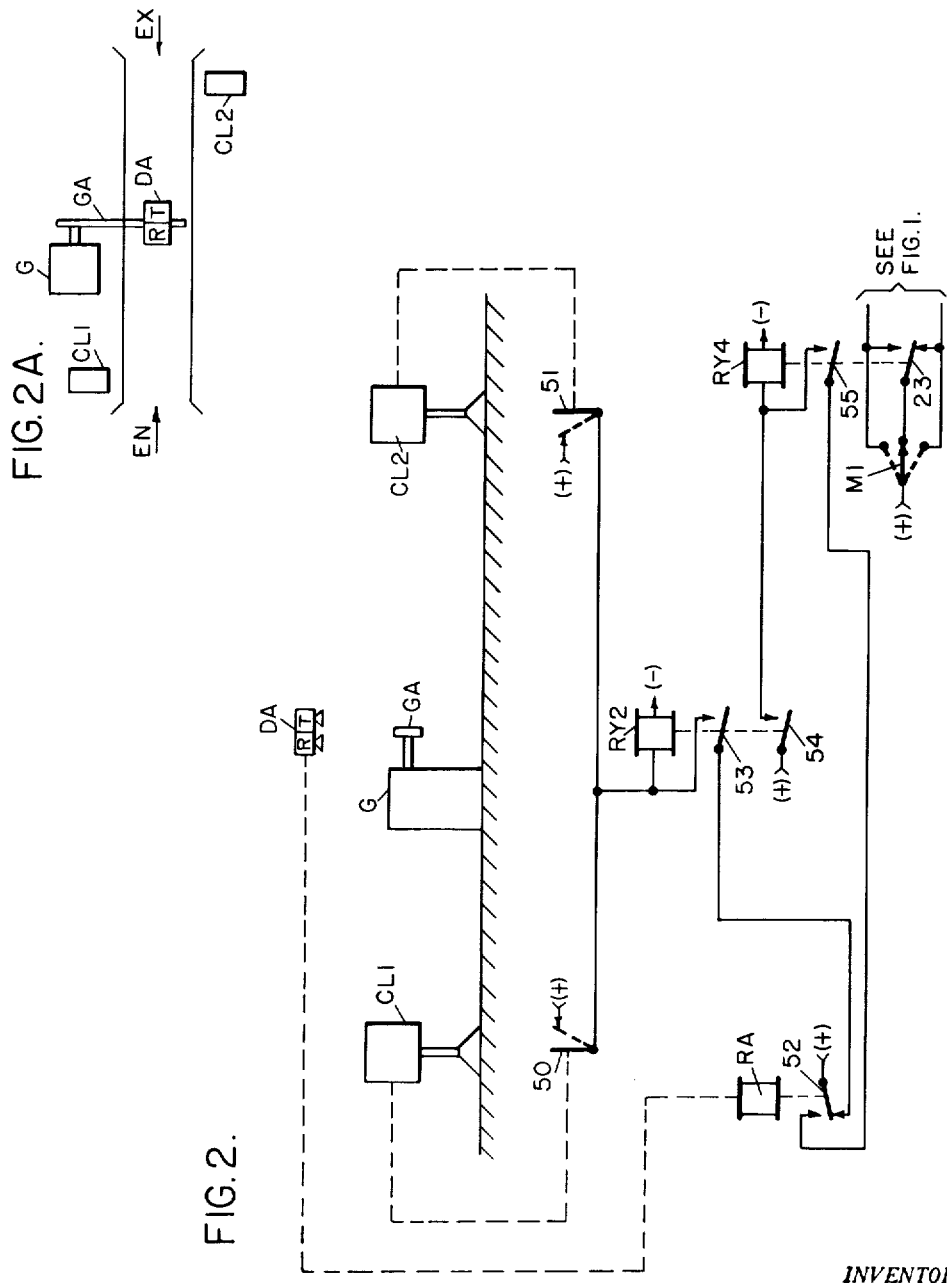

Nov. 13, 1962  J. H. AUER, JR  3,063,179
VEHICLE PARKING AREA GATE CONTROL SYSTEM
Filed Oct. 16, 1959  4 Sheets-Sheet 3

INVENTOR.
J.H. AUER JR.
BY
HIS ATTORNEY

Nov. 13, 1962  J. H. AUER, JR  3,063,179
VEHICLE PARKING AREA GATE CONTROL SYSTEM
Filed Oct. 16, 1959  4 Sheets-Sheet 4

INVENTOR.
J.H. AUER JR.
BY
HIS ATTORNEY

United States Patent Office 3,063,179
Patented Nov. 13, 1962

3,063,179
VEHICLE PARKING AREA GATE
CONTROL SYSTEM
John H. Auer, Jr., Rochester, N.Y., assignor to General
Railway Signal Company, Rochester, N.Y.
Filed Oct. 16, 1959, Ser. No. 846,917
8 Claims. (Cl. 39—1)

This invention relates to the control of gates for vehicle parking areas, and more particularly pertains to which a system employing vehicle detectors of the ultrasonic type.

It is sometimes desirable to provide parking areas for vehicles which may be supervised automatically either to restrict the area to vehicles with passes or for the purpose of collecting parking fees. This is usually done by providing a gate controlled in accordance with coin and/or pass operated devices together with detectors of the presence of vehicles. In most of these systems now in use, it has been difficult to properly coordinate the coin or pass operated devices with the detectors of presence of the vehicles.

In accordance with the present invention, it is proposed to provide ultrasonic detectors responsive only to vehicles and not to people, with such detectors so coordinated with the coin or pass operated devices as to provide the desired control of the gates to give the proper supervision of entering vehicles.

Another object of the present invention is to provide coordination between the vehicle detectors and coin or pass operated device for the control of an entering gate to cause such gate to be closed, or at least partially closed, between successive vehicles which are following relatively close together. This feature is for the purpose of giving a warning to drivers that the gate will be positively closed if a second unauthorized vehicle tries to closely follow a first authorized vehicle.

Another purpose of the present invention is to provide for a gate to be freely operated by vehicles which are trying to leave a restricted parking area.

Another purpose of the present invention is to provide control for a gate governing traffic in both directions so as to operate the gate in a way to restrict the passage of vehicles in one direction by the coin or pass operated devices but to allow the gate to be freely operated by vehicles travelling in the opposite direction.

A further purpose is to provide an organization which is capable of operating a gate for supervising the passage of vehicles in both directions in accordance with coin or pass operated devices.

Other objects, purposes and characteristic features of the present invention will be in part obvious from the accompanying drawings and in part pointed out as the description of the invention progresses.

In describing the invention in detail reference will be made to the accompanying drawings, in which like reference characters represent corresponding parts throughout the several views, and in which:

FIG. 1 illustrates one form of the system of the present invention providing the desired control of a gate to restrict traffic in one direction in accordance with a coin or pass operated device but to allow free passage of vehicles in the opposite direction;

FIG. 1A is a diagrammatic illustration of the arrangement of FIG. 1 as viewed from above;

FIG. 2 is a diagrammatic illustration of a control system for a gate wherein traffic in both directions is subject to the coin or pass operated device.

FIG. 2A is a diagrammatic illustration of the arrangement of FIG. 2 as viewed from above;

Figure 3:
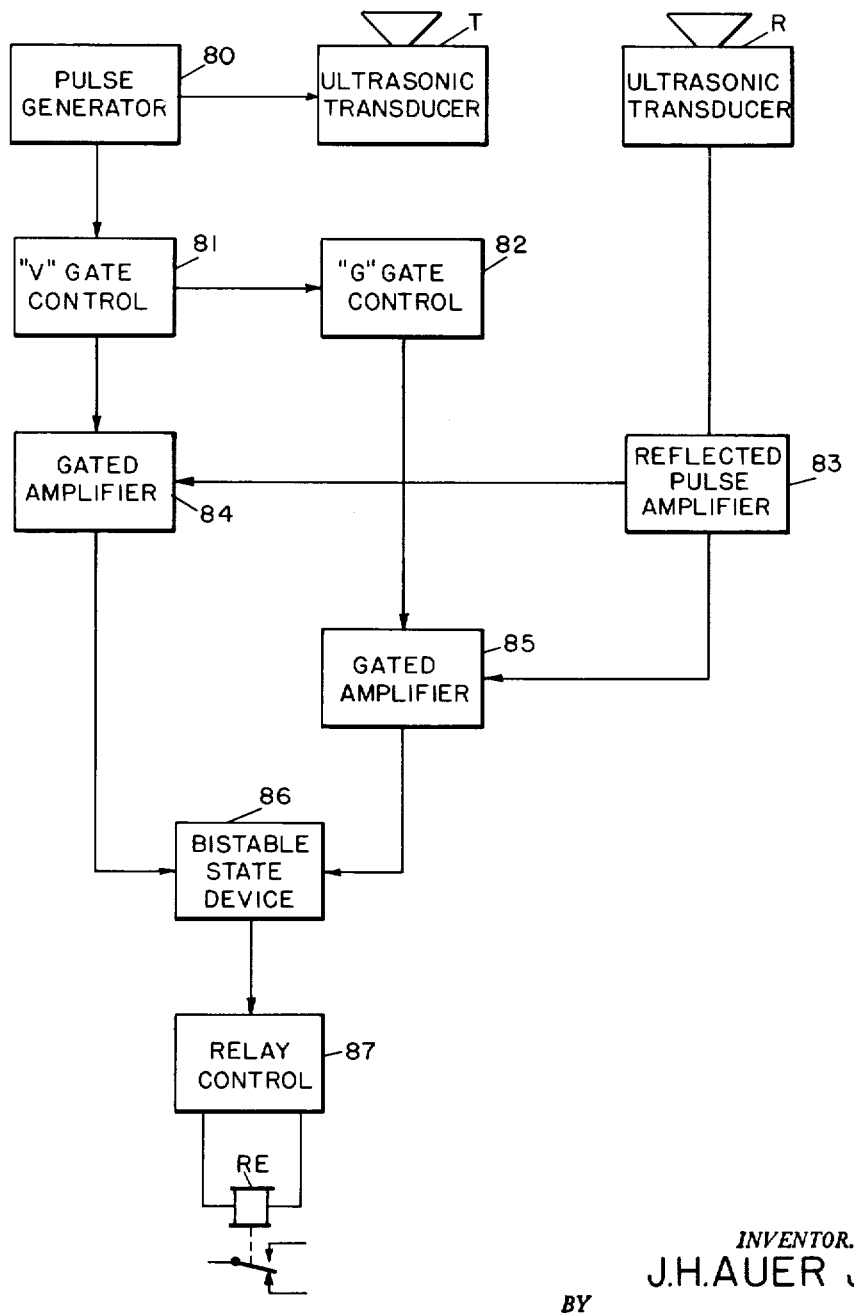
FIG. 3 is a block diagram of the ultrasonic vehicle detector suitable for the forms of the invention shown in either FIGS. 1 or 2.

For the purpose of simplifying the illustration and facilitating in the explanation, the various parts and circuits constituting the embodiment of the invention have been shown diagrammatically and certain conventional elements have been shown in block form, the drawings having been made more with the purpose of making it easy to understand the principles and mode of operation than with the idea of illustrating the specific construction and arrangements of parts that would be employed in practice. The symbols (+) and (—) are employed to indicate the positive and negative terminals respectively of suitable batteries, or other sources of direct current; and the circuits with which these symbols are used always have current flowing in the same direction.

This specification will discuss the two forms of the present invention separately for the purpose of making clear the organization and their operation. The first form shown generally in FIGS. 1 and 1A relates to the supervision of vehicle traffic in one direction but with the free movement of vehicle traffic in the opposite direction. This form is particularly adapted for use in parking lot areas for workers in offices, factories, and the like, where the supervised parking is over a distributed period of time, but the unrestricted flow of traffic may occur within a limited period of time.

The second form of the invention generally shown in FIGS. 2 and 2A provides for the supervision of vehicle traffic in both directions and is more particularly useful in connection with toll gates and the like. This second form is also useful in connection with parking areas where the entering and leaving vehicles are at distributed times so as to minimize the conflict of traffic in opposing directions.

*Structure and Organization*

In this first form of the invention, it is contemplated that a power operated gate G is located at the entrance to a parking area. Just in approach to such gate G, a suitable coin or pass operated device is located approximately nine to ten feet from the gate arm GA. Above the gate arm GA is a suitable vehicle detector DA. Similarly, on the inside of the area with respect to the gate arm GA is another vehicle detector DB. Such detector may be spaced from seven to ten feet from the gate arm depending upon the lengths of the vehicles involved. This distance between detectors DA and DB should be so selected that the shortest vehicle in passing from one detector to the other will be detected by the second detector before the first detector ceases to detect its presence. This is useful in effecting the directional control of the gate as will be later described in detail. Other suitable distances may be selected when desired to employ the invention with other vehicles of different lengths than the conventional U.S. automobile.

In accordance with the present invention, the vehicle detector is preferably of the ultrasonic type such as shown, for example, in the prior application of Kendall et al., Ser. No. 808,736, filed April 24, 1959, now Patent No. 3,042,303. Another such ultrasonic detector is shown in the Auer application Ser. No. 820,325, filed June 15, 1959, now Patent No. 3,045,909, and has briefly been illustrated in FIG. 3 by a block diagram to schematically indicate its broad functions. Both of these co-pending applications incidentally are assigned to the assignee of the present invention.

Generally speaking, a pulse generator 80 provides pulses of ultrasonic energy to the transmitting transducer T. Such transducer T causes these pulses to be beamed as indicated in FIG. 1 by the detector DA or DB. When ultrasonic pulses of energy strike the ground or pavement, or some other reflecting surface, such pulses are reflected back to the receiving transducer R. These reflected pulses are supplied to a reflected pulse amplifier 83 which in turn supplies an output to the gated amplifiers 84 and 85.

A "V" gate control 81 is supplied with pulses from the pulse generator 80 and in turn controls the gated amplifier 84 so that it may give an output to the bistable device 86 only if a reflected sonic pulse is received during a particular time interval following a transmitted pulse. In a similar manner the "V" gate control 81 supplies energy to the "G" gate control 82 so that it can in turn control the gated amplifier 85. Such control provides that a reflected sonic pulse can cause the gated amplifier 85 to provide an output only if such reflected pulse is received during a particular time allotted to the "G" gate control following that time allotted to the "V" gate control.

In other words, the pulses of ultrasonic energy are transmitted sufficiently spaced to allow for reflections to be received by the transducer R while no energy is being transmitted by the transducer T. If reflected ultrasonic pulse energy is received as reflected from a vehicle, then its time of reception after the transmitted pulse is shorter than a pulse reflected from the ground or pavement. Thus, it can be seen that the "V" gate control 81 and "G" gate control 82 can be adjusted to respectively allow reflected pulses to be passed by the gated amplifier 84 or 85 dependent upon whether such pulses are received from a vehicle or from the ground.

When ground pulses are successively received the bistable state device 86 is operated to one (normal) condition; but if vehicle reflected pulses are successively received the bi-stable device 86 is operated to its opposite (operated) condition in which it remains until ground pulses are again received. This means that once reflected pulses are received from a vehicle, the bi-stable state device 86 remains in its corresponding operated condition even though pulses should temporarily be discontinued as upon the passage of a convertible automobile or the like. When such vehicle has passed beyond the reflecting zone, or a zone in which it prevents ground reflections, then the ground pulses are again received and the bi-stable state device 86 is returned to a normal condition.

The bi-stable state device 86 when in an operated condition resulting from the reception of vehicle reflected pulses, acts through the relay control 87 to cause the normally released relay RE to be picked up or actuated.

On the other hand, when ground pulses are reflected resulting in the operation of the bi-stable device to its normal condition, then the relay RE is dropped away or released.

However, the relay control 87 is so constructed that once the bi-stable device has been operated to a particular condition in which it has remained for an appreciable time, momentary operations of the bi-stable device to the opposite condition does not cause the operation of the relay RE to the new condition until it has persisted for an appreciable time. For example, when a vehicle has caused reflected pulses to be received, but has moved to such a position near the edge of the detecting zone that some ground pulses are also received, it is evident that the relay RE should be maintained picked up until the vehicle is wholly out of the detecting zone. This is accomplished by the relay control 87 by requiring that the bi-stable state device 86 remain in a particular condition for at least a predetermined time before the relay control is effective to actuate the relay RE to the new condition.

It can be seen that this type of detecting organization is highly useful in connection with the control of the gate G since the gate arm GA should be maintained in a raised position throughout the presence of a vehicle beneath it. For this reason, the relay RE should be maintained picked up throughout the passage of a vehicle regardless of whether it is a regular automobile or truck, or whether it is a convertible or an open truck with canvas covered cargo. Thus, for the purposes of the present disclosure, it will be understood that the relays RA and RB of FIG. 1 may each be controlled in a manner such as shown in FIG. 3, i.e. dropped away during the absence of vehicles and picked up steadily during the passage of a vehicle beneath it regardless of the type of vehicle involved.

Figure 4:
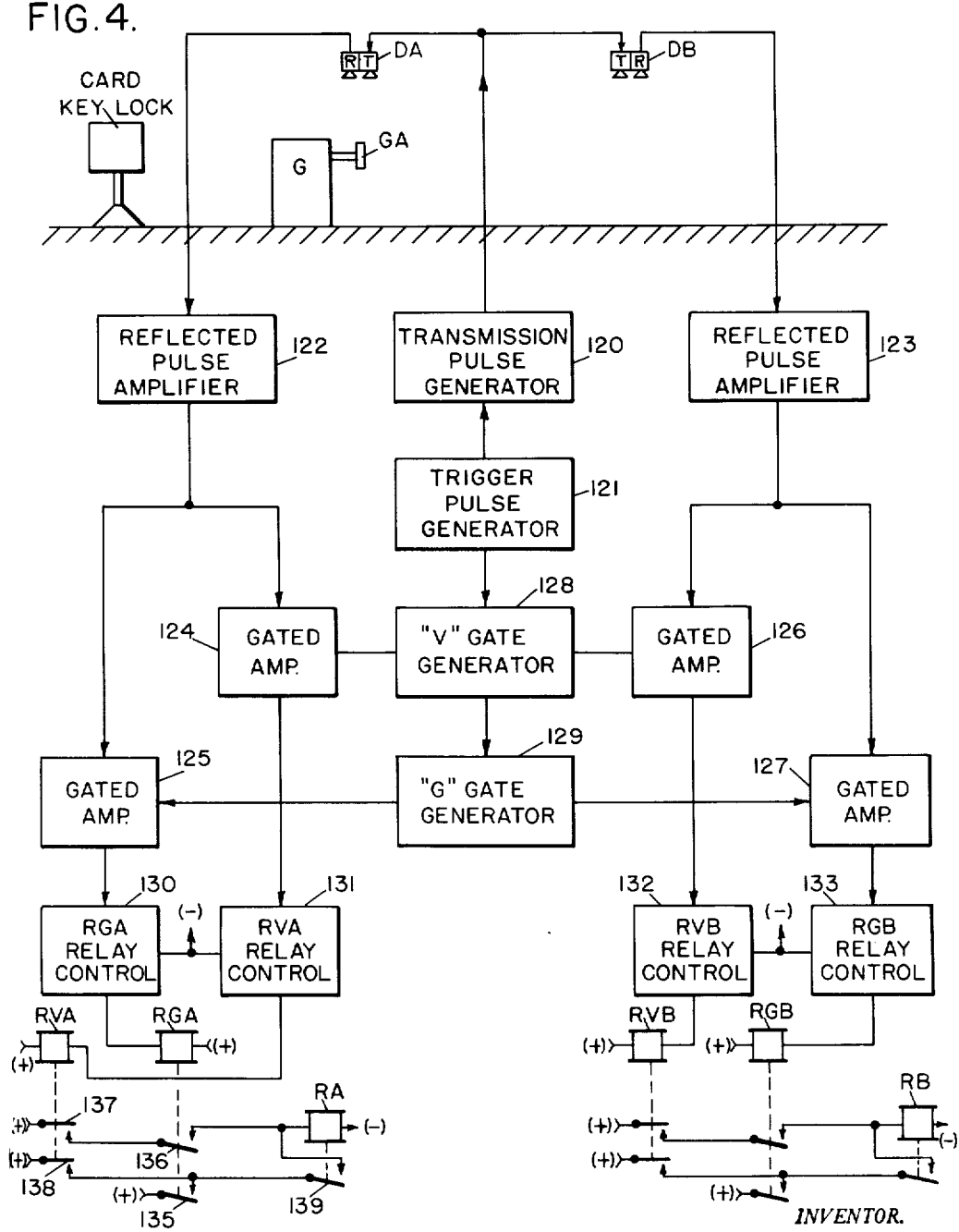
FIG. 4 is a block diagram of another ultrasonic vehicle detector which is suitable for use in the embodiments of the invention illustrated in either FIG. 1 or FIG. 2.

Another form of detecting organization is illustrated in FIG. 4 which is a simplification and combining of parts of a system such as shown in the prior application of H. C. Kendall et al., Ser. No. 808,736, filed April 24, 1959.

Since the gate control organization of the present invention involves two detectors DA and DB, the transmission pulse generator 120 can be common to the transmitting transducer T of both detectors DA and DB. Such transmission pulse generator 120 is then controlled by a trigger pulse generator 121 so that pulses of ultrasonic energy are transmitted simultaneously by both transmitting transducers T of the detectors DA and DB respectively. The trigger pulse generator 121 also acts upon the "V" gate generator 128 and the "G" gate generator 129 in turn, which are also common to the receiving apparatus associated with the receiving transducers R of both detectors DA and DB.

The reflected pulse amplifier 122 is connected to the receiving transducer R of the detector DA and supplies energy to two gated amplifiers 124 and 125. The amplifier 124 is gated for allowing the passage of vehicle reflected pulses, and the amplifier 125 is gated to allow the passage of ground reflected pulses. The ground reflected pulses repeated by the gated amplifier 125 are supplied to the ground relay control 130 to release the relay RGA; but, when there are no ground reflected pulses relay RGA picks up. When vehicle reflected pulses are received, the relay control 131 causes the relay RVA to be dropped away.

These two relays RGA and RVA cooperate to control the relay RA. More specifically, so long as ground pulses are reflected and received by the receiving transducer R of detector DA, the relay RGA is maintained released; but, if such pulses are interrupted by a person or non-reflecting object, then the relay RGA picks up and the relay RVA remains picked up. The closure of front contact 135 of relay RGA cannot pick up the relay RA because of the open stick contact 139. Likewise, the closure of front contact 136 of relay RGA cannot complete the pick-up circuit for relay RA because of the open back contact 137 of relay RVA.

When the ground pulses are interrupted and vehicle reflected pulses are also received, then the relay RGA is picked up and the relay RVA is released. This completes a pick-up circuit for relay RA from (+), through a circuit including back contact 137 of relay RVA, front contact 136 of relay RGA, windings of relay RA, to (—). So long as vehicle pulses are received the relay RA also has a stick or holding circuit closed from (+), through back contact 138 of relay RVA, front contact 139 of relay RA, windings of relay RA, to (—). Such stick or holding circuit is also maintained closed until ground pulses are again received even though vehicle reflected pulses are not received. This is because of the stick circuit closed from (+), through front contact 135 of relay RGA, front contact 139 of relay RA, windings of relay RA, to (—). In this way, the relay RA is controlled to give the same operation as disclosed in FIG. 3 for the relay RE.

The relay RB is controlled in a similar way as relay RA. More specifically, the reflected pulse amplifier 123 is connected to the receiving transducer of the detector DB and upplies energy to two gated amplifiers 126 and 127. The implifier 126 is gated for allowing the passage of vehicle eflected pulses, and the amplifier 127 is gated to allow he passage of ground reflected pulses. The ground reflected pulses repeated by the gated amplifier 127 are supplied to the ground relay control 133 to release the relay RGB; but, when there are no ground reflected pulses, elay RGB picks up. When vehicle reflected pulses are eceived, the relay control 132 causes the relay RVB to e dropped away. These two relays RVB and RGB cooperate to control the relay RB as described in detail for elay RA. For this reason, the detailed description of its ssociated circuits will not be further discussed.

It is thus apparent that the relays RA and RB of FIG. 1 s controlled by the detectors DA and DB may be controlled in various ways, two of which have been shown, o long as these relays are controlled to represent the ctual presence of a vehicle regardless of its type and ound reflective characteristics.

Referring now to FIG. 1, it will be noted that the relays RA and RB respectively controlled in accordance with he vehicle detectors DA and DB in turn act through the elays RY1, RY2, RY3 and RY4 subject to the coin or ass lock device CL for governing the operation of the ate by up and down control relays RY5 and RY6 respectively. There are manual controls M1 and M2 which are sed under various conditions later to be described.

Referring to FIG. 1A, let us assume that a car is entering in the direction indicated by the arrow EN. This car :ops at the coin (or pass) lock device CL and in response to a coin or a pass, the apparatus causes the gate G ) raise its arm GA. The car then proceeds toward the ght and passes under the detector DA which maintains he gate control such as to hold the gate arm GA in a aised position so long as the presence of such vehicle is etected. The detector DA is effective, due to its characteristics above described to maintain this condition egardless of the type of vehicle including automobiles, onvertibles, ordinary trucks, or cargo trucks with canvas overed cargo until such vehicle has entirely passed beyond he beam of the transmitter T of the detector DA.

As such vehicle proceeds, it passes beneath the detector B and its presence is detected before the detector DA ceases to detect its presence. But the operation of such etector DB does not interfere with the restoration of the ate arm GA to a blocking position as soon as the vehicle asses out of the detection range of the detector DA. If second vehicle is following the first vehicle relatively lose and inserts a coin or pass in the coin lock device CL hich the first vehicle is still detected as being present by e detector DB, the gate arm GA continues towards its owered position and fully reaches it. But, if the first ehicle is moving right along and ceases to be detected by etector DB before the gate arm GA reaches its fully owered position, then the actuation of the coin lock evice CL causes the gate arm to be operated to a raised osition from whatever intermediate position it has ached. From this it can be seen that the entering hicles should not follow any closer than the distance om the coin lock device CL to a point outside and beyond the detecting zone of the detector DB, since that is e minimum spacing for entering vehicles. In this way, e vehicles travelling to the right are individually allowed pass beneath the gate arm GA.

If two vehicles are following at a substantial distance, or e first vehicle is travelling very slowly, then the gate arm A always reaches a fully lowered position between the hicles. But, if the vehicles are travelling at the minimum spacing, then the gate arm GA will only dip downardly during the time that the first vehicle is traveling tween detector DA and the exit point of the detection ne for detector DB. Such operation warns all following vehicles that the gate arm is proceeding to a lowered osition behind each vehicle and must have its device CL erated for each vehicle. If a following vehicle should try to proceed closely following a first vehicle without properly operating the coin lock device CL, the gate arm GA would actually proceed downwardly on top of such unauthorized following vehicle. In brief, each vehicle should take note that the insertion of its coin or pass in the lock device CL has actually caused the upward movement of the gate arm GA before proceeding past the location of the coin lock device CL.

Should a vehicle insert a coin or pass in the coin lock device CL resulting in the gate arm GA being raised, but without such vehicle proceeding along the lane into the restricted area, the gate arm GA would remain in a raised position until a car has entered or left the restricted area. In other words, such an actuation of the coin lock device CL only requires the passage of a single vehicle in one direction or the other to automatically restore the system to its normal operating condition.

On the other hand, when a vehicle enters the lane in the direction of the arrow EX, and assuming there is no vehicle travelling in the opposite direction, it is detected first by the detector DB which immediately causes the gate arm GA to be raised. As the vehicle moves beneath the detector DA, it in turn obtains control of the gate arm GA and maintains it raised until the vehicle passes out of the range of its control and this operation takes place regardless of the type of vehicle as above explained.

When successive vehicles travel in the direction of the arrow EX, the gate arm GA can be maintained steadily raised so as to allow a continuous flow of vehicles. This of course assumes that the successive vehicles are following relatively close together although doing so with a safe spacing. In this way vehicle movement is supervised or restricted in one direction but is allowed to freely flow in the opposite direction.

More specifically, let us assume that a car is moving in the direction of arrow EN and stops to insert a coin or a pass in the lock device CL. This causes the contact 10 to be operated to complete a circuit for energizing relay RY2 from (+), through a circuit including back contact 20 of relay RB, contact 10, winding of relay RY2, to (−). As soon as this relay RY2 picks up, it closes its front contact 21 to shunt the contact 10 and thus create a stick circuit including back contact 20 of relay RB for maintaining relay RY2 energized. This is because contact 10 is only closed momentarily.

The picking up of the relay RY2 completes an energizing circuit for the relay RY4 from (+), through a circuit including back contact 20 of relay RB, front contact 22 of relay RY2, winding of relay RY4, to (−). The manual contact M1 is usually left in a center position for automatic operation but may be moved upwardly to close a circuit for energizing relay RY5 through a gate operated contact 14. This relay RY5 closes front contact 24 to energize the gate mechanism G and operate the gate arm GA to an upward position. When such gate arm is in the raised position, the contact 14 is open and the relay RY5 is deenergized, but the gate arm GA remains in that operated position.

On the other hand, should the manual contact M1 be operated to a lower position, while the gate arm GA is in a raised position, then contact 15 would be in its dotted line position and allow the RY6 to be energized to close its contact 27 to operate the gate G and its gate arm GA to its lower position. When the gate arm GA reaches the lowered position, the contact 15 is restored to its full line position to deenergize relay RY6.

But under the circumstances assumed, the manual contact M1 is in a center position for automatic operation. The picking up of the relay RY4 thus closes a pick up circuit for relay RY5 from (+), through contact M1 in a center position, front contact 23 of relay RY4, gate contactor 14, winding of relay RY5, to (−). The closure of contact 24 causes the gate G to operate its gate arm GA to a raised position as above described.

The vehicle traveling in the direction of the arrow EN proceeds through the lane toward the parking area and passes beneath the detector DA. This causes the relay RA to be picked up, as previously described, closing front contact 25 to energize relay RY1 through an obvious circuit. The picking up of relay RY1 then closes front contact 26 to maintain relay RY2 picked up through its stick circuit from (+), through a circuit including front contact 26 of relay RY1, front contact 21 of relay RY2, windings of relay RY2, to (—). This stick circuit is effective to hold the relay RY2 energized, although the relay RB is picked up opening back contact 20 when the front of a vehicle enters the detecting zone of detector DB, so long as such vehicle is under the gate arm GA and the detector DA. This of course prevents the gate arm GA from coming down on the top of an authorized vehicle then beneath the detector DA. As above mentioned, the beam of ultrasonic energy emanating from the transmitter T of the detector DA is sufficiently broad to cause the detection zone to be extended for a limited distance of each side of the gate arm GA.

Another result of the picking up of relay RY1 is that a pick-up circuit is established through front contact 28 of this relay and through front contact 29 of relay RY2 to energize the winding of relay RY3 so that this latter relay then picks up. When this relay RY3 picks up, it closes its front contacts 30 and 31 to complete several stick circuits each closed under conditions to effect the desired functions.

In the first instance, so long as the relay RY1 is maintained energized by the relay RA as the result of the detection of the vehicle beneath the detector DA, a stick circuit is closed for relay RY3 from (+), through a circuit including front contact 32 of relay RY1, front contact 31 of relay RY3, windings of relay RY3, to (—).

As the car proceeds under the detector DB, the relay RB is picked up and closes a stick circuit for the relay RY3 from (+), through a circuit including front contact 20 of relay RB, front contact 30 of relay RY3, windings of relay RY3, to (—). Thus, as soon as the vehicle passes beyond the range of detector DA, relay RA drops away and releases relay RY1. This in turn releases relay RY2 because relay RB is now picked up opening back contact 20. In spite of the closure of back contact 22, relay RY4 is released because back contact 30 of relay RY3 is open. This allows back contact 23 of relay RY4 to close and cause the energization of relay RY6 to control the gate G to return its gate arm GA to a lowered traffic blocking position. It can be seen that this happens in spite of the fact that the vehicle is being detected by the detector DB. When the vehicle passes beyond the detector DB, the relay RB is released which opens front contact 20 to deenergize the stick circuit for relay RY3 so that it too is released.

From the above, it can be seen that the actuation of relay RB by a vehicle moving in the direction of arrow EN under normal circumstances of operation maintains the relay RY3 picked up through front contact 20 while the open back contact 20 prevents the actuation of contact 10 by the coin lock device CL from being effective. For this reason, the gate arm GA is operated toward a lowered position after each vehicle leaves the detecting zone for detector DA, and so long as it is in the detecting zone of detector DB. As soon as the vehicle leaves the detecting zone of detector DB, then a following vehicle can operate contact 10 and effect the raising of the gate in the manner above described.

Let us now assume that a vehicle approaches the gate G in the direction of the arrow EX. As this vehicle passes beneath the detector DB the energization of the relay RB is effected. This closes an energizing circuit for the relay RY4 from (+), through a circuit including front contact 20 of relay RB, back contact 30 of relay RY3, back contact 22 of relay RY2, windings of relay RY4, to (—). The energization of relay RY4 closes its front contact 23 to cause relay RY5 to be energized and thus control through its front contact 24 the gate G to operate the gate arm GA to its raised position.

As the vehicle proceeds to the left under the detector DA resulting in the picking up of the relay RA and relay RY1, energy is supplied to energize relay RY4 by a circuit from (+), through front contact 32 of relay RY1, front contact 33 of relay RY4, back contact 30 of relay RY3, back contact 22 of relay RY2, windings of relay RY4, to (—). This is in effect a stick circuit for relay RY4 to maintain the gate arm GA in a raised position so long as the vehicle is beneath the detector DA even though it has passed beyond the range of the detector DB so that relay RB has dropped away.

As soon as the vehicle passes beyond the range of the detector DA to the left, relay RA is released followed by the release of the relay RY1 which deenergizes relay RY4 so that its back contact 23 is closed to cause the energization of relay RY6 to close its contact 27 and operate the gate arm GA to a lowered traffic blocking position. However, if while the vehicle is beneath the detector DA, a subsequent vehicle passes beneath the detector DB, the resulting energization of relay RB closes front contact 20 to maintain the energization of relay RY4 resulting in the gate arm GA being maintained in a raised position even though the first vehicle passes beyond the detector DA and releases the relays RA and RY1. In this way successive vehicles moving in the direction of the arrow EX are able to maintain the gate arm GA steadily in a raised position. The spacing between the vehicles required to do this is approximately the distance between the detectors DA and DB. Since the vehicles moving out of a parking area through the restricted zone must be operating at a relatively low speed, such distance is sufficient for safe operation of the vehicles in a continuous lane. If, however, the vehicles approach the detector DB at greater spacing, then the gate arm GA may be part way down or fully lowered. As soon as such vehicle is detected by the detector DB, relay RB is picked up immediately energizing relay RY4, reversing the gate G in mid operation to raise the gate arm GA, or to raise it all the way if the arm has actually reached its full lowered position. Such operation provides for continuous leaving of cars with a minimum of delay.

This organization is thus adapted to the control of traffic into and out of parking areas, when the entering traffic is not conflicting as to time with the leaving traffic. The control of the gate restricts the entrance to authorized vehicle, but allows the free exit of all vehicles in a continuous flow of traffic.

Referring to FIG. 2A it can be seen that the locking devices CL1 and CL2 are on both sides of the gate G. Each of these devices can initiate the raising of the gate arm GA and is maintained raised while a vehicle is passing under the detector DA. Thus, only one detector is required and the detector DB of FIG. 1 is omitted in this form of the invention.

Referring to FIG. 2, the relays RY2 and RY4 are quite differently controlled than shown in FIG. 1.

More specifically, the operation of the locked device CL1 momentarily closes contact 50 to energize the relay RY2 through an obvious circuit. This is of course for a vehicle moving in the direction of the arrow EN. If a vehicle is moving in the direction of EX, then the locking device CL2 is actuated either by a coin or a pass or the like, to close contact 51 and energize relay RY2.

In either instance the relay RY2 is provided with a stick circuit closed from (+), and including back contact 52 of relay RA, front contact 53 of relay RY2, windings of relay RY2, to (—).

This stick circuit remains closed until the vehicle passes beneath the detector DA resulting in the picking up of relay RA. As soon as relay RY2 picks up and closes its front contact 54 the relay RY4 is picked up to energize relay RY4 and close front contact 23 to control the gate G as described in detail in connection with FIG. 1. With the relay RY4 energized causing the gate arm GA to be raised, a vehicle moving in either direction can then pass under the detector DA to cause relay RA to be picked up closing its front contact 52. This completes a stick circuit for relay RY4, from (+), through a circuit including front contact 52 of relay RA, front contact 55 of relay RY4, windings of relay RY4, to (—). This stick circuit is closed by the picking up of relay RA closing front contact 52 during the time that the relay RY 2 is releasing as the result of the opening of back contact 52. Thus, the stick circuit for relay RY4 is closed before the front contact 54 of relay RY2 is opened.

From the above, it can be seen that vehicles can thus be restricted in their operation for both directions of traffic.

In this connection, it should be understood that the manual contacts M1 and M2 and the other related control of the gate is the same in FIG. 2 as shown in FIG. 1. In this connection the manual contact M2 is merely an off and on contact for at times removing power from the gate. The circuit breakers CB1 and CB2 are provided for the purpose of protecting the circuits from overload which might be caused by the formation of ice on the gate arm or from other causes.

In the above description, it has been assumed that the detectors DA and DB are located above the area which they supervise, but it is to be understood that they could be located to one side of the lane and operate on a horizontal plane so long as they are constructed to accomplish the purposes of the present invention in which the detectors are capable of detecting vehicles of all types and yet to be unresponsive to the passage of people, animals, birds and the like.

In connection with the description of FIG. 1A, it has been pointed out how the coin lock device CL controls the gate to govern traffic in one direction and the vehicles may freely move in the opposite direction. It should be understood that this free movement of vehicles in the opposite direction does not have to be employed if it is only desired to employ the coin lock device CL for controlling traffic in one direction, such as at toll booths, and the like. All of the features described in connection with the operation employing the coin lock device may be retained. All that is necessary is to remove the connection to back contact 22 of relay RY2 and thus prevent the picking up of relay RY4 by vehicles moving in the direction of the arrow EX.

On the other hand, free exit control could be employed without the provision of entering control. This can be accomplished by eliminating the coin lock device CL and its related circuits.

These alternative subcombinations are mentioned because they are of themselves useful under various circumstances of control required for vehicular traffic.

Having thus described two forms of the gate control systems as specific embodiments of the present invention, it is desired to be understood that these forms are selected to facilitate in the disclosure of the invention rather than to limit the number of forms which it may assume; and it is to be further understood that various modifications, adaptations and alternations may be applied to the specific form shown to meet the requirements of practice, without in any manner departing from the spirit or scope of the present invention.

What I claim is:

1. A system for the control of traffic-blocking gate which is selectively actuable in a substantially vertical plane between vehicle-blocking and non-blocking positions and including a control circuit comprising in combination: gate operating means, gate control means associated with said gate operating means for actuating said gate to its non-blocking position to permit passage of a vehicle, said gate defining a vehicle contact detection zone wherein said gate can come into physical contact with a vehicle in the vicinity of said gate, vehicle presence sensing means, said sensing means being responsive to any vehicle within said vehicle contact detection zone, said sensing means being non-responsive to said gate, gate actuating means also associated with said gate operating means and being responsive at least in part to said vehicle sensing means for actuating said gate to said vehicle blocking position only provided that said vehicle sensing means is not responsive to a vehicle within said vehicle contact zone.

2. The invention as defined in claim 1 wherein said barrier actuating means includes a second vehicle detector of the presence-responsive type with its detection zone so located as to be occupied by a vehicle prior to reaching the location of said barrier while travelling in a predetermined direction through said defined passageway and being sufficiently closely spaced to said detection zone of the first-named vehicle detector as to permit concurrent occupancy of the respective detection zones by even the shortest vehicle likely to be encountered, said barrier actuating means operating said barrier to said non-blocking position when the detection zone of said second detector is first occupied by said vehicle, said control means operating said barrier means to said blocking position only provided that both said detection zones are concurrently unoccupied by a vehicle or vehicles.

3. The system of claim 1 in which said barrier actuating means comprises a lock device being operable to a released condition prior to the arrival of a vehicle at the barrier location while said vehicle is travelling in a predetermined direction along said passageway, said system further including a second vehicle detector of the presence-responsive type defining a detection zone which must be traversed by each vehicle travelling in said predetermined direction after passing the barrier location, said second vehicle detector controlling said barrier actuating means to permit actuating of said barrier to its non-blocking position in response to the releasing of said lock device only provided said detection zone of said second detector is then unoccupied.

4. The system of claim 1 in which said control means initiates operation of said barrier into its vehicle blocking position at the time of departure of a vehicle from said detection zone.

5. The system as defined in claim 1 wherein said barrier is rotatable in a substantially vertical plane, said vehicle detector comprises a sonic detector which includes means for transmitting repetitive pulses of sonic energy from an overhead location substantially vertically downward toward the pavement of said passageway and also includes overhead pulse reflection receiving means together with time gating means to differentiate between pavement reflection pulses and vehicle reflection pulses.

6. The system of claim 5 wherein said control means is governed by said vehicle detector to operate said barrier to its vehicle blocking position only upon the restoration of reception by said receiving means of pavement reflection pulses.

7. In combination, a physical barrier actuable between vehicle blocking and non-blocking positions, means for actuating said barrier to its non-blocking position to permit a vehicle to pass and for restoring said barrier to its blocking position when said vehicle has passed, and vehicle detector means for preventing restoration of said barrier to its blocking position when said vehicle is in any such position that said barrier would come into contact with said vehicle, said vehicle detector means comprising: pulse transmitting means transmitting a beam of repetitive energy pulses in such a direction as to impinge upon said vehicle when it is in any position that said barrier could come into contact with said vehicle but so as to impinge instead upon a more distant energy reflecting surface when no vehicle is present, beam confining means for confining the beam of transmitted pulses to a sufficient degree to prevent impingement of substantially any part thereof on said more distant reflecting surface when said vehicle is present and in said any position but having sufficient spread so as not to be wholly blocked by an energy reflecting surface substantially smaller than normally presented by a vehicle such as by a human being or animal or the like, receiving means responsive both to reflections of said transmitted energy pulses from said vehicle and also from said more distant reflecting surface, time gating means connected to said receiving means for differentiating between the reflection pulses received from said vehicle and from said more distant surface, and output means also connected to said receiving means and being controlled to indicate that a vehicle has passed out of said beam only when said receiving means again receives reflections from said more distant surface; said vehicle detector means permitting restoration of said barrier to its blocking position only when said output means is controlled to indicate that said vehicle has passed out of said beam.

8. In a system for the control of a traffic-blocking barrier which is selectively actuable between vehicle blocking and non-blocking positions and includes a control circuit comprising in combination: gate operating means, gate control means associated with said gate operating means for actuating said gate to its non-blocking position, vehicle presence sensing means comprising pulse transmitting means for transmitting a beam of repetitive energy pulses in a direction so as to impinge upon a vehicle passing the location of said barrier and so as to impinge alternatively upon a more distant energy reflective surface when no vehicle is present, receiving means for receiving reflections of said transmitted energy pulses and including time gating means for differentiating between vehicle reflection pulses having a relatively short round-trip propagation time and reflection pulses from the more distant reflecting surface having a relatively long round-trip propagation time, output means connected to said receiving means and being operated to a distinctive condition representative of a vehicle having vacated the beam of transmitted energy pulses only when said receiving means again receives reflection pulses from the more distant reflecting surface, and gate actuating means associated with said gate operating means and controlled at least in part by said output means for permitting operation of said barrier to its vehicle-blocking position only provided said output means has been operated to said distinctive condition.

References Cited in the file of this patent

UNITED STATES PATENTS

| | | |
|---|---|---|
| 2,622,140 | Muller et al. | Dec. 16, 1952 |
| 2,735,202 | King | Feb. 21, 1956 |
| 2,795,875 | Nutter et al. | June 18, 1957 |
| 2,826,753 | Chapin | Mar. 11, 1958 |
| 2,842,876 | Chicoine et al. | July 15, 1958 |
| 2,874,819 | Nutter | Feb. 24, 1959 |
| 2,906,505 | Orr et al | Sept. 29, 1959 |
| 2,965,893 | Barker | Dec. 30, 1960 |